United States Patent [19]

Hardwick

[11] Patent Number: 5,067,649

[45] Date of Patent: Nov. 26, 1991

[54] BONDING METAL COMPONENTS

[75] Inventor: Roy Hardwick, Troon, Ayrshire, Wales

[73] Assignee: Imperial Chemical Industries PLC, London, England

[21] Appl. No.: 608,638

[22] Filed: Nov. 6, 1990

Related U.S. Application Data

[63] Continuation of Ser. No. 395,154, Aug. 17, 1989, abandoned, which is a continuation of Ser. No. 240,496, Sep. 2, 1988, abandoned.

[30] Foreign Application Priority Data

Sep. 18, 1987 [GB] United Kingdom ............ 8721984
Feb. 1, 1988 [GB] United Kingdom ............ 8802169

[51] Int. Cl.$^5$ ............................................. B23K 20/08
[52] U.S. Cl. ................................. 228/107; 228/157; 228/190; 228/231
[58] Field of Search ............... 228/107, 118, 157, 181, 228/190, 231, 2.5; 148/11.5 A, 127

[56] References Cited

U.S. PATENT DOCUMENTS

| | | | |
|---|---|---|---|
| 2,766,514 | 10/1956 | Adams | 228/157 |
| 3,019,513 | 2/1962 | Hornady, Jr. et al. | 228/157 |
| 3,194,643 | 7/1965 | Ma et al. | 148/127 |
| 3,449,819 | 6/1969 | Blank | 228/107 |
| 3,498,849 | 3/1970 | Munday et al. | 148/127 |
| 3,735,476 | 5/1973 | Deribas et al. | 228/107 |
| 4,732,312 | 3/1988 | Kennedy et al. | 228/157 |
| 4,811,766 | 3/1989 | Sastry et al. | 228/107 |

FOREIGN PATENT DOCUMENTS 10347  1/1978  Japan ............................ 228/107

OTHER PUBLICATIONS

Metals Handbook Ninth Edition, vol. 6, pp. 705–718, copyright 1983.

*Primary Examiner*—Samuel M. Heinrich
*Attorney, Agent, or Firm*—Cushman, Darby & Cushman

[57] ABSTRACT

The process is described for bonding together of metal components wherein the components are explosively bonded together and the resulting composite is treated at elevated temperature. In the process the bond strength over weaker bonded areas is enhanced and the bond strength is rendered more uniform over the total bonded area. The process is especially advantageous for bonding high strength aluminum alloys such as aluminum/lithium alloys, and is particularly useful in the fabrication of composites bonded at selected areas for subsequent expansion to form hollow structures for use in aircraft components.

7 Claims, No Drawings

BONDING METAL COMPONENTS

This is a continuation of application Ser. No. 07/395,154, filed on Aug. 17, 1989, which was abandoned upon the filing hereof and which is a continuation of 07/240,496, filed Sept. 2, 1988, now abandoned.

This invention relates to a process for bonding together of metal components and to composite metal structures formed by the process. The process is especially applicable for bonding plates of light metal or metal alloys at selected areas to produce composites which can be "superplastically" formed into complex hollow structures. Such structures formed from aluminium alloys such as aluminum/lithium alloys have particular application in high performance fighter aircraft where high strength and lightweight structures can be used to maximum advantage. Due to a present inability to bond these alloys, by diffusion bonding methods superplastically formed components of aluminum/lithium alloy must be joined by mechanical fasteners. A structure containing such mechanical fasterners must be designed to accommodate this method of fastening and the associated stresses. These design modifications almost invariably result in an increase in weight by comparison with a similar structure designed around bonded components.

Aluminum and titanium alloys are used extensively in aircraft construction but titanium and titanium alloys are favored for complex hollow components as they can be diffusion bonded and superplastically formed by a composite process which provides structures of light weight and high strength.

Basically, the method consists of cleaning the metal surfaces followed by contamination of that surface by a protective agent in selected areas where bonding is to be actively prevented. The two surfaces are then placed together and heated under pressure and vacuum. In areas of metal/metal contact, diffusion bonding occurs, i.e. the constituent atoms at the interface are mutually attracted and held together by the sharing of electrons. In the contaminated areas, bonding cannot occur.

In a second stage of the method the selectively bonded composite is placed within a die, at a suitable temperature and pressurized gas is introduced into the non-bonded cavities within the composite. Gas is also introduced into the die cavity at a lower pressure and adjustment of the pressure differential controls the rate of expansion of the composite as it fills the die cavity to assume the die shape and form the desired component. By this means, elongation in excess of 1000% can be attained.

High strength aluminum alloys, for example aluminum/lithium alloys would be advantageous materials for many aircraft parts but their use is limited as they cannot be fabricated by the aforedescribed method because the bonds produced by diffusion bonding are too weak. The alloy, even after cleaning, quickly forms an adherent oxide scale which effectively inhibits bonding by diffusion and the bond shear strengths which have been attained are only 30–40 MPa approximately.

However, the bonding of aluminum alloys by explosive bonding methods as described for example in United Kingdom Patent Specification Nos. 923746, 1032019, 1168264 and 1248794 is well known and widely practiced.

In explosive bonding, the metal plates to be bonded into the composite are stacked above each other with controlled intervening gaps. Explosive is placed upon the top plate and, when detonated, the plates are forced together creating a collision front at each interface which progresses over the intended bond area to produce the bond. Such bonding usually extends over the entire limits of the bonded area. Bonding in selected areas between two sheets is difficult, whether the bonded areas are determined by "patterning" of the explosive charge or by "stopping off" or contaminating the surfaces of selected areas. When the explosive charge is "patterned", i.e. located at selected areas of the plate only, variation of factors, such as plate flatness and explosive geometry, result in bonds varying in quality and strength to an unacceptable degree. "Stopping off" techniques equally give varied results because the jetting phenomena of explosive bonding causes "carryover" of the "stopping off" medium into cleaned areas where bonding is desired. The degree of "carryover", and hence bond quality, is affected by the orientation of the desired bond area to the collision front. This orientation is governed both by the pattern of the required bond areas and the location of the initiation point.

Additional complications arise when three or more metal plates are bonded together, as is required, for example before superplastic forming in the manufacture of aircraft parts.

The main problem arising when several plates are bonded by explosives is one of variability in bond strength due to the decaying collision pressure and collision angle at successive interfaces with a corresponding reduction in bond integrity. This decaying pressure also affects the degree of carryover of any stopping medium incorporated at the interfaces. Charge patterning is impractical for multiple layers as the required bond areas at successive interfaces are frequently staggered rather than being coincident in a vertical plane. Furthermore, the areas having inferior bond strength cannot be detected by non-destructive testing methods so that the structures are generally unsuitable for use in critical applications such as aircraft components.

It is an object of this invention to provide an improved process for bonding together metal components which will produce uniformly strong bonds at each interface of a multilayer composite, so that composites of light metals or alloys produced by bonding selected areas of the components may be expanded by the aforedescribed method of "superplastic" forming.

In the explosive bonding process the surface layer of the metal areas being bonded is removed together with any surface contaminants (including oxides) originally present. This effect facilitates the explosive bonding of metals with highly reactive surfaces for example aluminum/lithium alloys. As mentioned above when bonding at multiple interfaces simultaneously and/or at selected areas the bond strength is generally variable. We have now found that when the explosively formed bonds are subjected to heat treatment, the bond strength is rendered more uniform and lower bond strengths can be enhanced to a value approaching or equalling that of the parent material while high strength bonds remain unimpaired.

The inhibiting effects of oxide films can thus be eliminated by explosive welding and, even if the resulting bond has inferior strength, this strength can be enhanced by heat treatment. Moreover, the vacuum and pressure requirements of diffusion bonding are eliminated allowing increases in the component size without the escalation in costs associated with the added sophistication in the required tooling.

In accordance with this invention in a process for bonding together metal components wherein the components are explosively bonded together to form a composite metal structure of varying bond strength, the explosively bonded composite is heat treated at an appropriate elevated temperature whereby the bond strength of the weaker bonded areas is enhanced and the bond strength is rendered more uniform over the total bonded area.

Using the invention, multi-layer composites can advantageously be explosively bonded and heat treated to result, if desired, in a selectively bonded composite of uniform bond strength over the selected areas and at all interface levels. This composite can then be "superplastically" formed in a conventional manner to provide a composite structure of uniform and adequate strength throughout and suitable to fulfil the requirements of aircraft structures.

Accordingly, the invention also includes a method of manufacturing a hollow metallic structure comprising:

explosively bonding metal components at selected areas only of adjacent surfaces to form a composite structure having at least one unbonded area between adjacent surfaces which is enclosed by bonded area;

heat treating the composite at elevated temperature to enhance and render more uniform the strength of bonding between the components of the composite structure; and introducing pressurised gas between the adjacent components at the enclosed unbonded area(s) to expand the composite structure and form the desired hollow structure.

The invention is especially advantageous when used in conjunction with the method of explosive bonding described in our co-pending United Kingdom patent application No. 8729340. In this method several laminar components are bonded together to form a laminar composite the several interfaces being bonded only in predetermined areas.

The predetermined areas are defined by coating part of the surface (usually the upper surface) of each of the component metal laminae, with a contaminant medium over the pre-selected areas of its related interface which are to remain unbonded. These components are stacked in their predetermined order, one above the other with a gap of appropriate dimensions between the component laminae. The upper surface of the uppermost lamina is not coated with contaminant medium. A layer of granular inert material, such as for example sodium chloride is laid down upon the upper surface of the upper lamina. This composite assembly is placed upon a metal anvil whose upper surface is also coated with a layer of granular inert material. Above this total assembly is suspended a metal driver plate of substantial thickness and mass, this driver plate lying essentially parallel to the upper surface of the loose composite assembly. A gap of at least the thickness of the driver plate exists between the lower surface of the driver plate and the upper surface of the composite assembly. Upon the upper surface of the driver plate is placed a layer of explosive whose detonation velocity is less than 120% of the sonic velocity of the metal of the composite having the lowest sonic velocity.

On initiation of the explosive the driver plate is deformed below the detonation front thus producing an angular deformation of the driver plate as it is impelled downwards to collide with the layer of granular inert material upon the surface of the underlying composite assembly. A collision front is thus formed at the surface of the layer of granular inert material, which front travels progressively across the surface at the same velocity as the detonation velocity of the explosive. The granular inert material is progressively compressed at this point thus causing the first component lamina to be also progressively deformed beneath this collision front. The layer of granular inert material effectively prevents bonding of the driver plate and upper surface of the upper component lamina. The upper lamina, being of relatively small mass by comparison with that of the driver plate, is deformed by assuming the angle of the driver plate. It is then impelled by the descending driver plate to collide with the pre-coated upper surface of the second lamina at essentially the same angle as the driver plate and with essentially the same momentum. The second lamina is in turn similarly deformed by the impacting first layer assuming essentially the same angle and momentum of the driver plate. The deformation and impelling of successive laminae to collide with each lower metal lamina continues until the bottom layer is reached. This lamina is in turn deformed to compress the underlying layer of granular inert material on top of the underlying anvil. Because of its high mass the anvil cannot be deformed and it acts as a restraining means thereby producing a collision pressure at each of the interfaces of the metal laminae. Bonding then occurs at each of these interfaces, but only in those areas of the interfaces where the contaminant medium is not present. A bonded composite is produced with a predetermined number of interfaces and with each interface bonded and unbonded in predetermined areas.

Despite only marginal decreases in collision angle and momentum at each interface when using this bonding method, there will be marginal variation in bond strength at the several interfaces, the strength being marginally less at each successive interface. When the composite is heat treated in accordance with the invention the bond strength is rendered uniform over the predetermined areas of bond, and is generally enhanced.

In order to produce a hollow structure, the bonded laminar composite is placed within a suitable die at an appropriate temperature. Pressurised gas is introduced into the non-bonded cavities of the composite. Gas is also introduced at a lower pressure into the die cavity and expansion of the non-bonded cavities occurs at a rate controlled by adjustment of the gas pressure differential. Expansion continues until the composite assumes the die shape with interfacial cavities also of predefined shape. Thus a composite structure can be formed of exceptionally high strength/weight ratio.

A further advantage of using the aforementioned method of our co-pending United Kingdom patent application No. 8729340 is that the wave amplitude at the interfaces is uniform throughout the composite and, most importantly, is small. Wave amplitude at an interface increases as a function of distance from the initiation point until a point is reached where the wave amplitude reaches an unacceptable proportion of the lamina thickness and, in the case of the upper lamina, eventually emerges through the surface or causes fractures to occur. The lower amplitude achieved by the use of a driver plate allows much longer run lengths to be obtained before the wave amplitude becomes unacceptable. Thus explosively bonded and superplastically formed components of increased area dimensions can be produced.

The process of the invention is especially advantageous for the manufacture of explosively bonded composites of aluminum or aluminum alloys, particularly aluminum/lithium alloys which hitherto were difficult to bond satisfactorily at selected areas only of adjacent component surfaces.

Preferably the explosively bonded composite is heat treated at a temperature in excess of 400° C., a temperature in the range 400°-600° C. being generally suitable.

The invention will be further illustrated by the following Example:

EXAMPLE

Two explosively bonded sample composites were produced each comprising of two bonded 300 mm. ×3 mm. thick sheets of aluminum/lithium alloy using explosive loadings as follows, the lighter loading for sample 1 being selected to produce a relatively weak bond:
 Sample 1=2.67 gms/sq.cm.
 Sample 2=4.77 gms/sq.cm.

Eight shear tests carried out on each of the two samples gave the following range of values:
 Shear strength:
 Sample 1=147-163 MPa. (Megapascal)
 Sample 2=175-198 MPa.

Each of the two samples were heated to an annealing temperature of 450° C. for two hours and cooled to ambient temperature. A further shear strength evaluation indicated that the strength of the parent material had been reduced, the measured shear strength being that of the parent materials which were as follows:
 Sample 1=142-148 MPa.
 Sample 2=142-155 MPa.

The two samples were further subjected to "solution heat treatment" and age hardening by heating 15 mins. at 530° C., quenching in water and maintaining for 5 hours at 185° C.

A further eight shear tests were carried out upon each of the two samples with the following range of values.
 Sample 1=174-189 MPa.
 Sample 2=173.4-173.6 MPa.

The results show a significant difference in the bond strength of the two samples in the "as clad" condition as expected.

Sample 1 was comparatively weak although significantly better than any previously attained values for diffusion bonding.

Sample 2 appeared to be of variable strength but all values of bond strength were comparatively high reaching approximately those of the parent material strength in parts.

After annealing at 450° C., the shear tests exhibit a reduction in the shear strength of the parent material, the indicated bond strength in both samples being of the same value.

"Solution heat treatment" and age hardening increased the shear strength of the parent material and also increased the bond strength in both samples to the high level exhibited by the parent material.

Applicant is grateful to British Aerospace PLC, 11 Strand, London, for carrying out the heat treatment and tests recorded in the above example.

I claim:

1. A method of manufacturing a hollow metallic structure comprising explosively bonding metal components at selected areas only of adjacent surfaces, said surfaces having the same composition, to form a composite structure having at least one unbonded area between adjacent surfaces which is enclosed by bonded area;
 heat treating the composite at appropriate elevated temperature to enhance and render more uniform the strength of bonding between the components of the composite structure;
 and introducing pressurized gas between the adjacent components at the enclosed unbonded area to superplastically form the composite structure into the desired hollow structure.

2. A process as claimed in claim 1 wherein the metal components comprise metal selected from the group consisting of aluminum and aluminum alloys.

3. A process as claimed in claim 2 wherein the metal components comprise an aluminum/lithium alloy.

4. A process as claimed in claim 2 wherein the composite is heat treated at a temperature of more than 400° C.

5. A process as claimed in claim 2 wherein the composite is heat treated at a temperature in the range 400°-600° C.

6. A process as claimed in claim 5 wherein the composite structure is annealed at a temperature in the range of 400°-450° C., "solution heat treated" at a temperature in the range of 530°-600° C., and subsequently age hardened.

7. A process as claimed in claim 5 wherein the composite structure is annealed at a temperature of about 450° C., "solution heat treated" at a temperature of about 530° C., and subsequently age hardened at a temperature of about 185° C.

* * * * *